US012114795B2

(12) United States Patent
Sher

(10) Patent No.: US 12,114,795 B2
(45) Date of Patent: Oct. 15, 2024

(54) ROBOTIC GLOVE DONNING MACHINE

(71) Applicant: RSM GLOBAL LLC, Brooklyn, NY (US)

(72) Inventor: Sagi Sher, Jerusalem (IL)

(73) Assignee: RSM Global LLC, Brooklyn, NY (US)

(*) Notice: Subject to any disclaimer, the term of this patent is extended or adjusted under 35 U.S.C. 154(b) by 57 days.

(21) Appl. No.: 18/170,263

(22) Filed: Feb. 16, 2023

(65) Prior Publication Data

US 2023/0190024 A1 Jun. 22, 2023

Related U.S. Application Data

(63) Continuation of application No. PCT/US2021/046325, filed on Aug. 17, 2021.

(60) Provisional application No. 63/066,896, filed on Aug. 18, 2020.

(51) Int. Cl.
*A47G 25/90* (2006.01)

(52) U.S. Cl.
CPC .................. *A47G 25/904* (2013.01)

(58) Field of Classification Search
CPC ........ A61B 42/40; A61B 42/50; A47G 25/904
See application file for complete search history.

(56) References Cited

U.S. PATENT DOCUMENTS

| | | | |
|---|---|---|---|
| 2002/0113079 A1* | 8/2002 | Corbett | A61B 42/50 221/303 |
| 2003/0094468 A1 | 5/2003 | Sinai | |
| 2004/0149788 A1 | 8/2004 | Sato | |
| 2018/0289190 A1 | 10/2018 | Avshalom et al. | |
| 2021/0228299 A1* | 7/2021 | Löfholm | A61B 42/50 |

FOREIGN PATENT DOCUMENTS

| | | |
|---|---|---|
| FR | 2962314 A1 | 1/2012 |
| WO | 2019/231377 A1 | 12/2019 |

OTHER PUBLICATIONS

International Search Report dated Dec. 9, 2021 from corresponding International Patent Application No. PCT/US2021/046325, 2 pages.
Written Opinion dated Dec. 9, 2021 from corresponding International Patent Application No. PCT/US2021/046325, 3 pages.

* cited by examiner

*Primary Examiner* — Nathan E Durham
(74) *Attorney, Agent, or Firm* — Ruggiero McAllister & McMahon LLC

(57) ABSTRACT

There is provided a glove donning device that includes (a) a hollow tube having an annular opening, (b) a vacuum head configured to acquire a glove having an opening, (c) a pair of hooks, (d) a first transporter configured to move the vacuum head and the glove towards the pair of hooks so that the pair of hooks is inserted into the opening of the glove, (e) a hook actuator configured to move the pair of hooks apart after the pair of hooks is inserted in the opening of the glove, and (f) a second transporter configured to (i) move the pair of hooks and the glove towards the hollow tube, and (ii) move the pair of hooks to position the glove opening over the annular opening of the hollow tube.

16 Claims, 15 Drawing Sheets

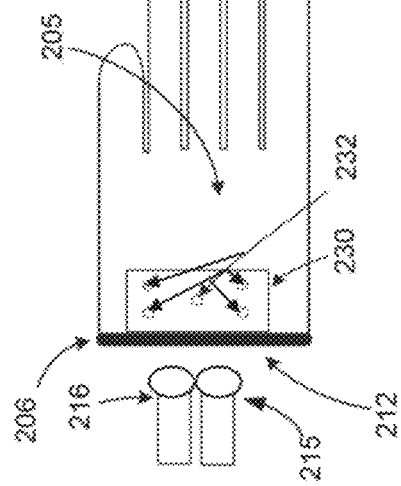
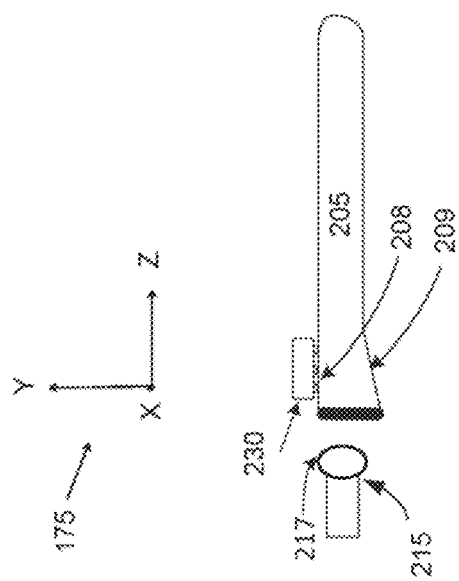
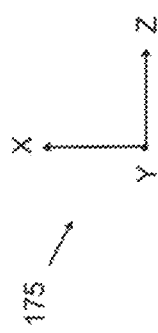
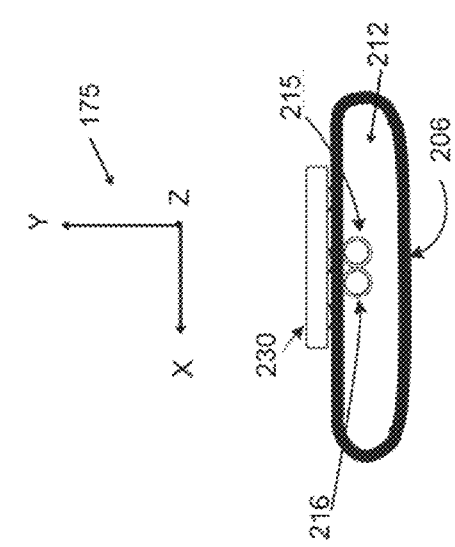

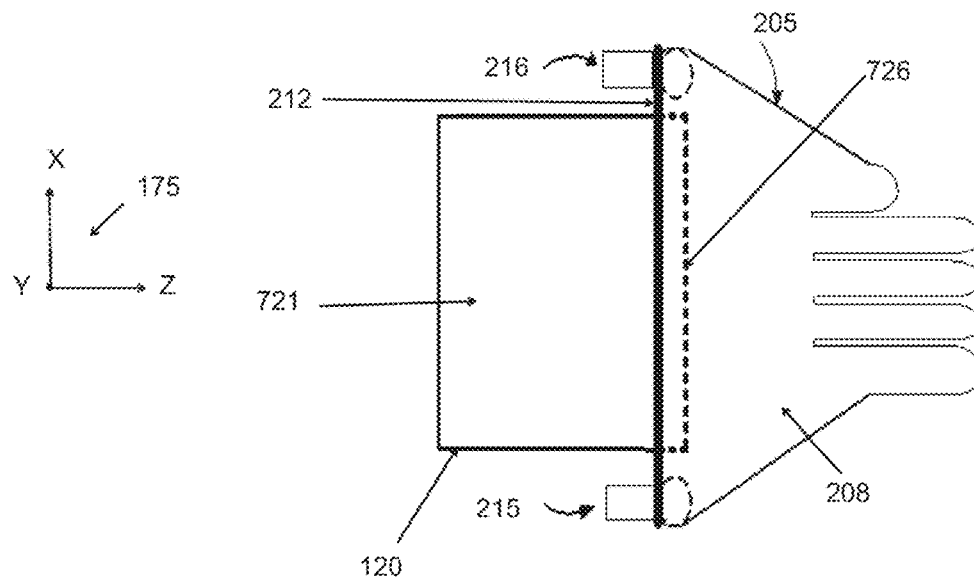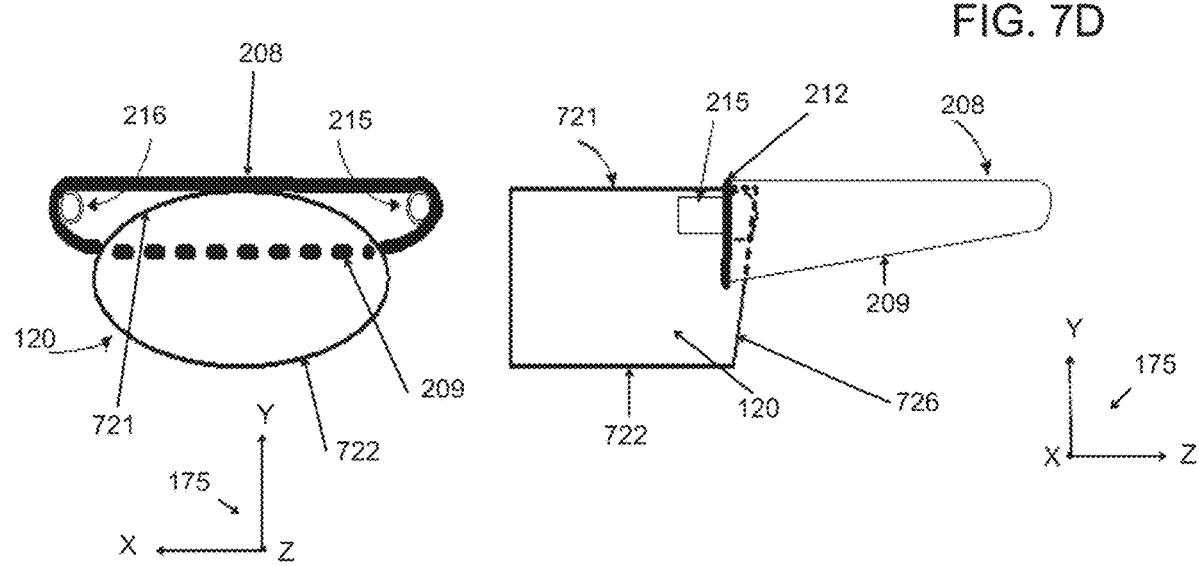

ROBOTIC GLOVE DONNING MACHINE

CROSS REFERENCE TO RELATED APPLICATION

This application is a continuation of International Application No. PCT/US2021/046325 filed on Aug. 17, 2021, and claims priority to U.S. Provisional Application No. 63/066,896 filed on Aug. 18, 2020, both of which are hereby incorporated herein by reference in their entirety.

BACKGROUND

1. Field of the Invention

The present disclosure is related to a glove donning machine that aids a user in putting on a glove.

2. Description of Related Art

Gloves are worn by various practitioners to protect themselves and those they serve from being infected by bacteria and viruses. Practitioners may include, but are not limited to, hospital workers, restaurant and food service workers, and workers in industries that produce and prepare medications, food and cosmetics.

The gloves themselves may come into inadvertent contact with bacteria, viruses and a wide range of contaminants, and thus, many glove wearers must discard gloves and don new ones frequently. The time spent replacing gloves may reduce the productivity of such workers, and the process of touching a new glove while in the process of donning it may contaminate a new glove before it is even worn.

Accordingly, there is a need for a device that reduces and/or eliminates the likelihood of contaminating a sterile glove during the process of donning the glove.

SUMMARY

A machine for rapidly donning gloves while preserving their uncontaminated state, is described herein.

The present disclosure describes a glove donning machine (GDM) that acquires a glove from a glove stack, transports the glove, so that the glove's opening is opposite a pair of hooks that are inserted into the glove's opening. The hooks then stretch apart the glove's opening. The opened and stretched glove is then transported to and placed onto and over an annular opening of a hollow tube. The glove can be clamped onto the tube after the glove is placed thereon. The glove is inflated so that a user can insert their hand into the hollow tube and into the glove to don the glove.

The above-described and other features and advantages of the present disclosure will be appreciated and understood by those skilled in the art from the following detailed description, drawings, and appended claims.

BRIEF DESCRIPTION OF THE DRAWINGS

FIG. 2C is a top view of a glove being held by a vacuum head in proximity to a pair of hooks within the GDM.

FIG. 2D is a side view of the glove being held by the vacuum head in proximity to the hooks as shown in FIG. 2C.

FIG. 2E is a rear view of the glove being held by the vacuum head in proximity to the hooks as shown in FIG. 2C.

FIG. 7C is a top view of the glove as shown in FIG. 7A after being moved towards and contacting a top surface of the hollow tube.

FIG. 7D is a side view of the glove as shown in FIG. 7C.

FIG. 7E is a rear cross-sectional view of the glove as shown in FIG. 7D.

DETAILED DESCRIPTION

Figure 1:
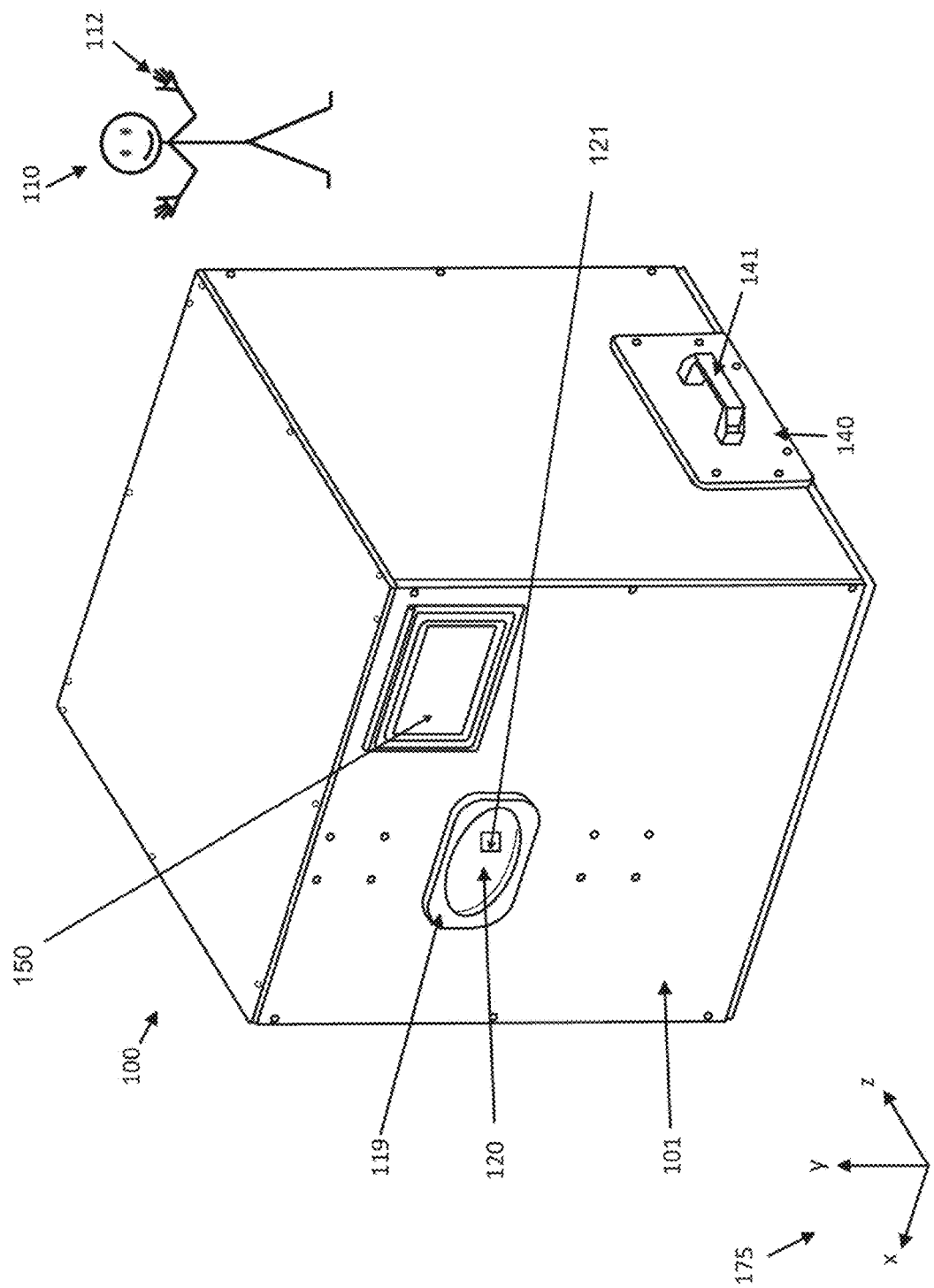
FIG. 1 shows a GDM and a user.

As shown in FIG. 1, a glove donning machine (GDM) 100 is packaged in a case 101. In one embodiment case 101 provides an airtight enclosure for GDM 100. GDM 100 includes (a) a glove magazine 140 that has a handle 141, and (b) an opening 119 to a hollow tube 120. A user 110 (not drawn to scale) inserts their hand 112 past opening 119 into hollow tube 120 in order for GDM 100 to don a glove onto hand 112. A sensor 121, such as an infrared light source and optical detector, utilized as a proximity detector, is placed near opening 119, and/or in hollow tube 120. GDM 100 also includes a display 150 for indicating machine status. A status may include machine-ready, empty glove magazine, number of remaining gloves in a magazine, number of gloves donned in the last hour, day and month, and malfunction message or codes. FIG. 1 further shows a coordinate system 175, having an x axis, a y axis and a z axis provided in relation to GDM 100. Movement parallel to the x axis will be described as horizontal, movement parallel to the y axis will be described as vertical, and movement parallel to z axis will be described as forward or backwards.

The following figures provide step-by-step illustrations and descriptions of the operation of GDM 100.

Figure 2:
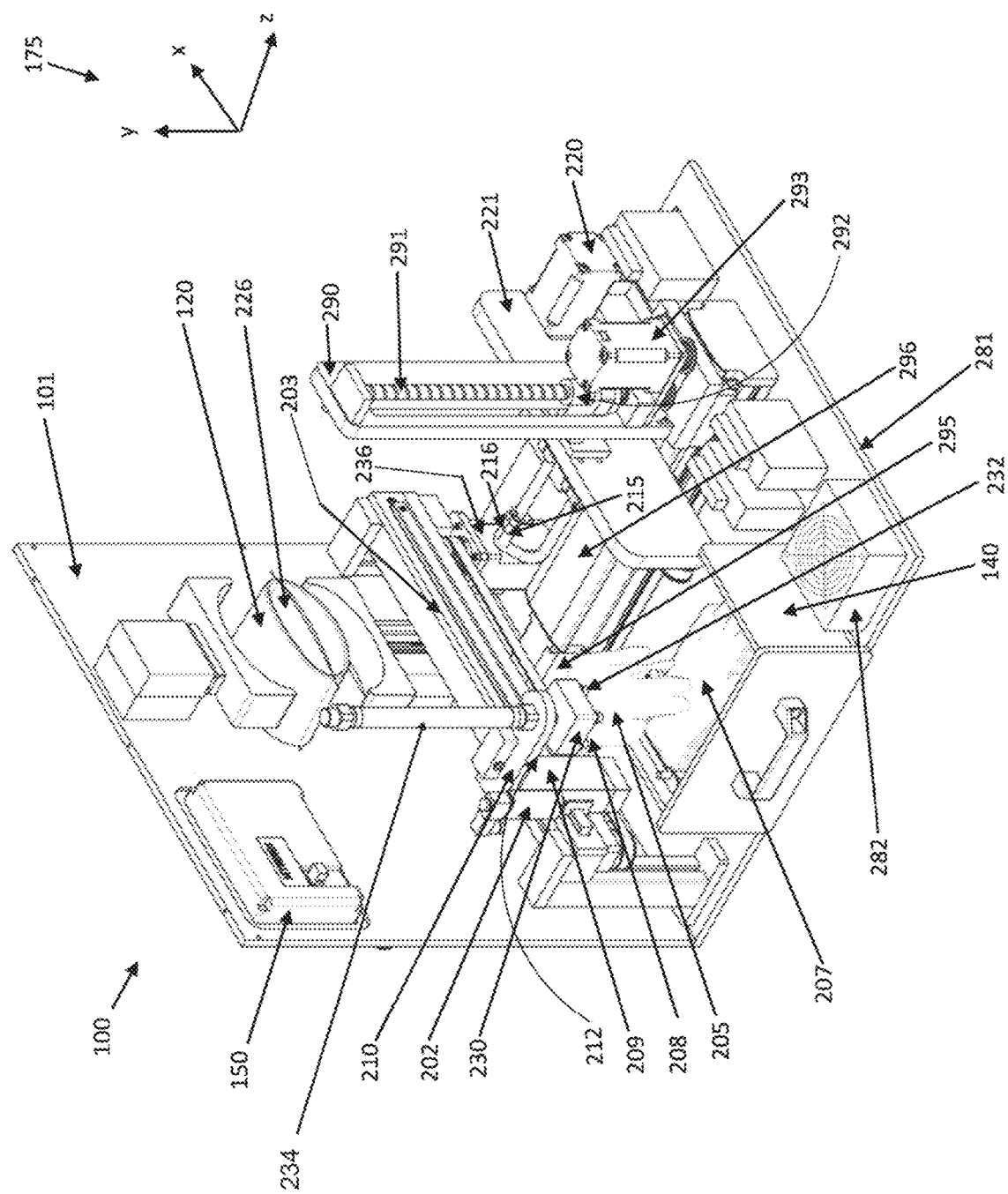
FIG. 2 is a rear perspective view of an opened GDM, showing a glove acquired by a vacuum head, from a stack of gloves in a glove magazine.

FIG. 2 shows a rear perspective view of GDM 100, opened. Glove magazine 140 contains a glove stack 207, where a glove 205 is situated as an uppermost glove on glove stack 207. A transporter 210 picks up glove 205 vertically from glove stack 207 by utilization of a vacuum head 230. Transporter 210 is a rectilinear transporter and is able to move vacuum head 230 horizontally along a track 203. Vacuum head 230 is attached to transporter 210, and has one or more vacuum orifices, one of which is designated as a vacuum orifice 232. Vacuum head 230 is able to move vertically up and down by utilization of an actuator 234, controlled by a solenoid valve 202. Actuator 234 is a pneumatic actuator. After transporter 210 moves vacuum head 230 over glove stack 207, vacuum head 230 is moved vertically downward via actuator 234, so that vacuum orifice 232 is made to contact an upper sleeve portion 208 of glove 205. Vacuum orifice 232 provides vacuum suction through vacuum head 230 in order to adhere upper sleeve portion 208 of glove 205 to vacuum head 230. When vacuum head 230 is moved vertically upward, glove 205 is lifted up and out of glove magazine 140, causing a lower sleeve portion 209 of glove 205 to hang loose, forming an opening 212 of glove 205. Opening 212 is the opening in glove 205 into which user 110 inserts hand 112. Opening 212 is not visible in FIG. 2, as it is behind vacuum head 230. Transporter 210 is mounted on a track 203, and rotation of an axle of a motor 236, moves transporter 210 and vacuum head 230 away from and towards glove stack 207, or parallel to the x axis.

Transporter 210 is able to move vacuum head 230 horizontally away from and towards glove stack 207, or parallel to the x axis. Vacuum head 230 moves glove 205 towards a hook 215 and a hook 216, so that glove opening 212 is opposite hooks 215 and 216. Hooks 215 and 216 are able to move apart and back together by utilization of a motor 220.

Transporter 290 includes a threaded rod 291 on which a nut 292 rides up and down by utilization of a motor 293. Nut 292 supports a plate 221 on which hooks 215 and 216 are mounted. Hooks 215 and 216 are able to move apart and back together. Transporter 290 is further able to move towards and away from hollow tube 120 on a track 296, or parallel to the z axis, via an actuator 295.

FIG. 2 further illustrates the portion of hollow tube 120 that is within case 101. Hollow tube 120 has sealing flaps 226 that enable case 101 to be airtight when user 110 is not placing hand 112 through hollow tube 120. Sealing flaps 226 block the ingress of contaminants into GDM 100 that are present in the room air external to case 101. When hand 112 enters hollow tube 120, and comes near, for example within 2 cm of sensor 121, a sequence begins. The sequence comprises acquiring a glove 205, wrapping it around hollow tube 120, inflating glove 205, opening sealing flaps 226, and allowing hand 112 to enter and don glove 205. In one embodiment, GDM 100 is slightly elevated from the surface upon which it rests by feet (not shown) and has a blower 282 mounted on a case floor 281.

FIGS. 2A-2E illustrate the removal of glove 205 from glove stack 207, and the subsequent positioning of opening 212 relative to hooks 215 and 216. Glove 205 is manufactured from a stretchable material, such as latex.

Figure 2A:
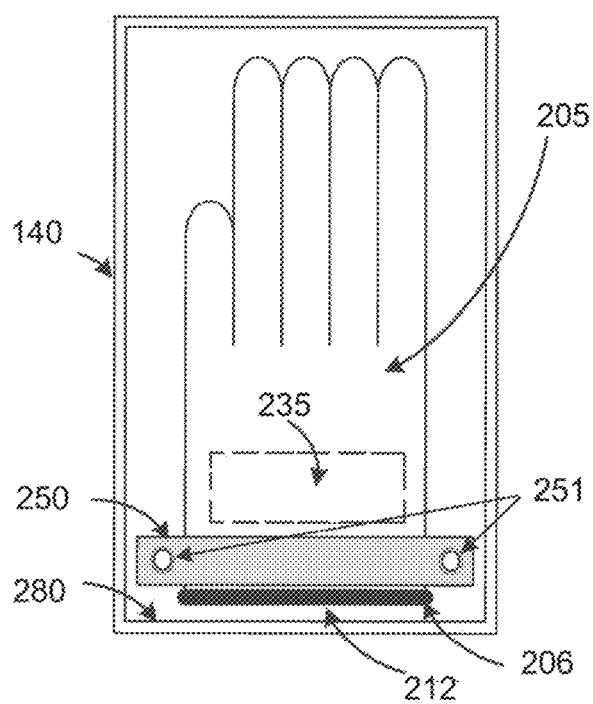
FIG. 2A is a top view of a glove magazine containing a stack of gloves.

FIG. 2A shows a top down view of glove magazine 140. As mentioned above, glove magazine 140 contains glove stack 207 and glove 205 is the uppermost glove of glove stack 207. The weight of a bar 250 compresses an area of glove 205 in proximity to opening 212. By virtue of the weight of bar 250, gloves in glove stack 207 are held in place with uniform positioning so that their openings, like opening 212, are parallel to bar 250. Bar 250 and opening 212 are in proximity to a glove acquisition zone 235. Glove acquisition zone 235 is beneath vacuum head 230 when vacuum head 230 is positioned above glove stack 207. Glove 205 has a thickened glove lip 206 at opening 212. Glove stack 207 is positioned with thickened glove lip 206 parallel to a wall 280 of glove magazine 140. A uniformity of positioning of gloves in glove stack 207 ensures that when glove 205 is removed from glove stack 207 and transported to hooks 215 and 216, hooks 215 and 216 are properly positioned relative to glove 205. Due to the uniformity of positioning of the gloves in glove stack 207, prior to vacuum head 230 moving glove 205, hooks 215 and 216 thereby have equal penetration into opening 212, prior to hooks 215 and 216 being moved apart to stretch opening 212. When hooks 215 and 216 stretch apart opening 212, the force and friction created between glove 205 and hooks 215 and 216, keeps glove 205 temporarily adhered on hooks 215 and 216.

Bar 250 has holes 251 that accommodate vertical pins 252 (see FIG. 2B), and have a slightly larger diameter than vertical pins 252, allowing bar 250 to slide along vertical pins 252 so that the weight of bar 250 compresses glove stack 207.

Figure 2B:
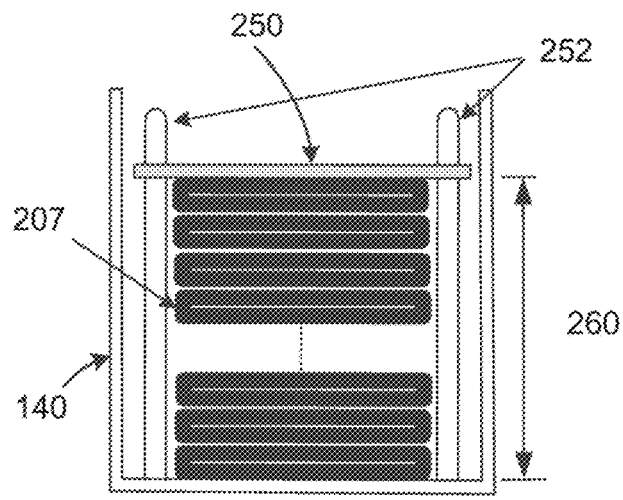
FIG. 2B is a side cross sectional view of the glove magazine of FIG. 2A with the stack of gloves.

Referring to FIG. 2B, when glove 205 is removed from glove stack 207, the weight of bar 250 compresses the remaining gloves in glove stack 207. Thus, the height of bar 250, automatically adjusts and decreases along with glove stack height 260, when glove 205 is removed from glove stack 207 by vacuum head 230.

Referring to FIG. 2C, a top view of glove 205 is shown, with glove 205 attached to vacuum head 230 via vacuum orifice 232, after transporter 210 has moved glove 205 horizontally away from glove stack 207 and towards hooks 215 and 216. Vacuum orifice 232 is shown with broken lines in FIG. 2C as it would not be visible through vacuum head 230 when viewed from above. Preferably, more than one vacuum orifice 232 is distributed over a sufficient area on a bottom surface of vacuum head 230 to grasp a flexible glove material such as the material of glove 205. For example, in a preferred embodiment a pattern of five vacuum orifices 232 in a one by two cm area is utilized, as shown in FIG. 2C. Transporter 210 moves glove 205 so that the center of opening 212 is in the proximity of hooks 215 and 216 as shown in FIG. 2C. When hooks 215 and 216 are centered at opening 212 of glove 205, transporter 210 stops moving vacuum head 230 and glove 205.

FIG. 2D shows a side view of glove 205, as situated in FIG. 2C, after transporter 210 has stopped moving horizontally towards hooks 215 and 216. Hooks 215 and 216 have ends 217. Ends 217 are slightly bulbous in shape.

FIG. 2E shows a rear view of glove 205, as situated in FIG. 2C, after transporter 210 has stopped moving. Although FIG. 2E shows hooks 215 and 216 touching each other before insertion into glove opening 212, in some embodiments hooks 215 and 216 do not touch each other prior to or during insertion into glove opening 212. As mentioned above, transporter 210, on which vacuum head 230 is mounted, transports glove 205 so that opening 212 is positioned opposite hooks 215 and 216.

Figure 3:
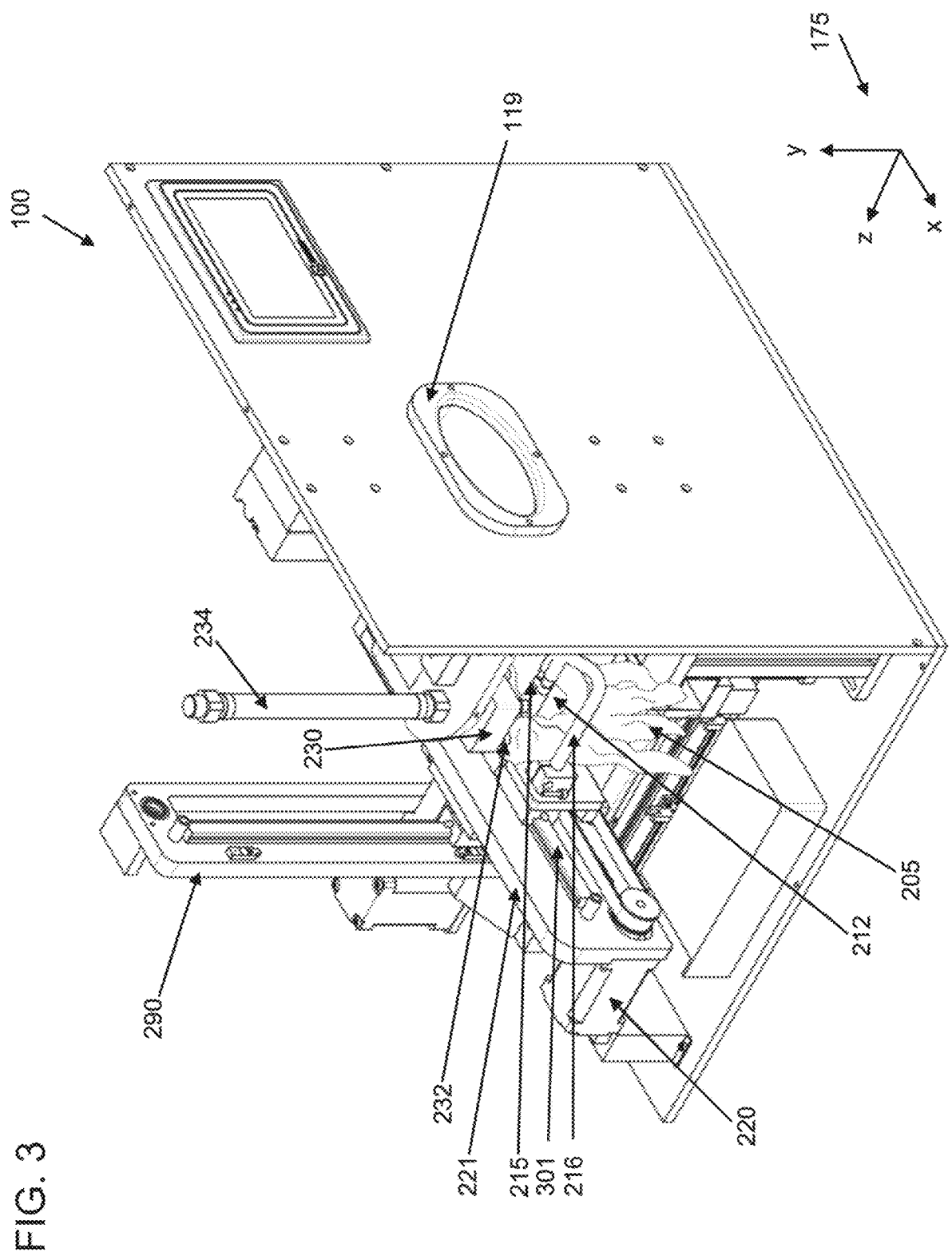
FIG. 3 is a front perspective view of the opened GDM of FIG. 1, showing a pair of hooks inserted into a glove opening after the glove has been moved away from its starting position.

Referring to FIG. 3, hooks 215 and 216 are able to move apart and together horizontally along a track 301. As mentioned above, transporter 290 moves along track 296, along the z axis, by utilization of actuator 295. Initially, hooks 215 and 216 are positioned away from hollow tube 120, allowing hooks 215 and 216 to be inserted into opening 212.

Figure 4:
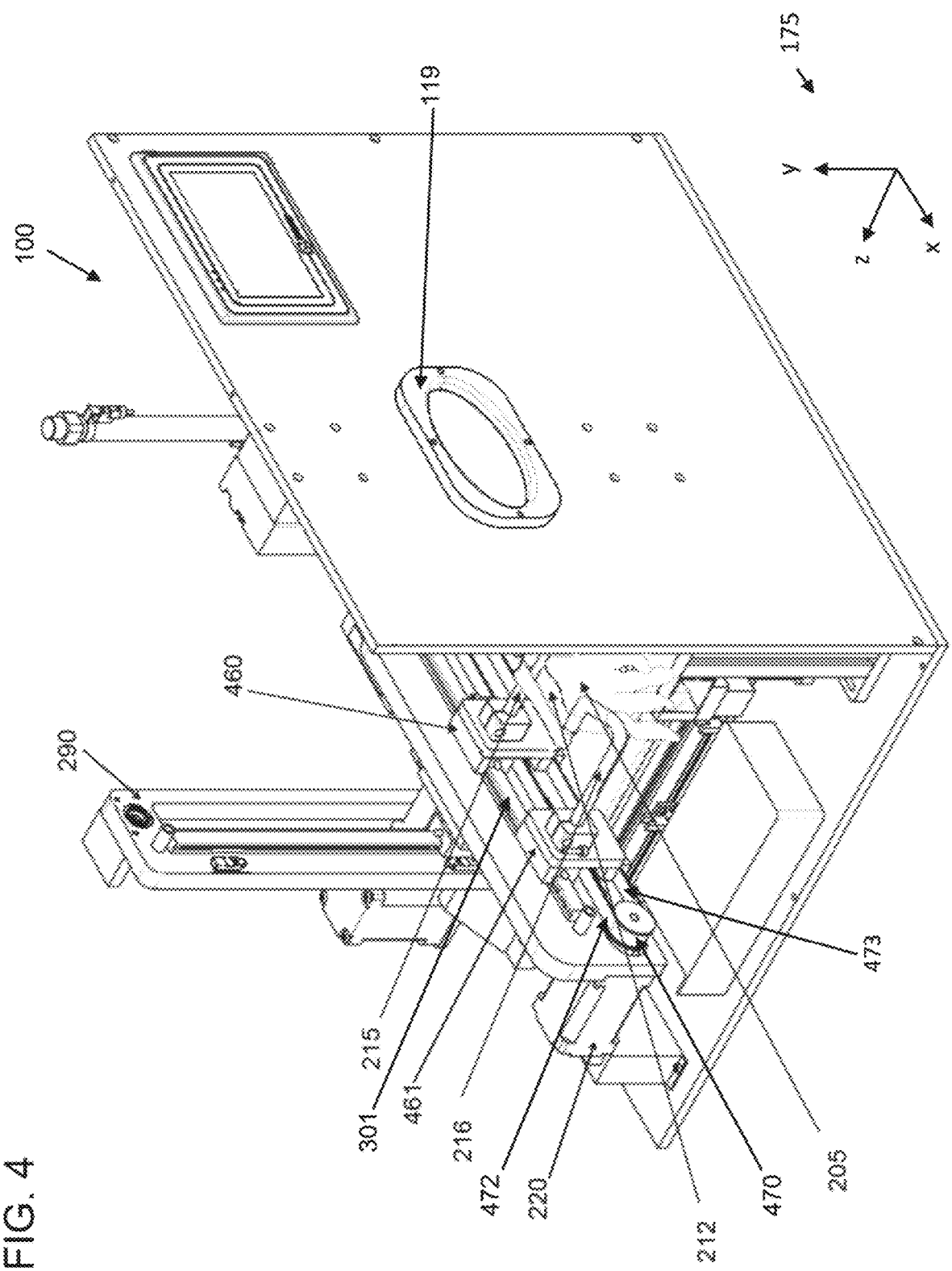
FIG. 4 is a front perspective view of the opened GDM of FIG. 1, showing the GDM after the hooks in the glove opening have been forced apart to widen the glove opening.

Referring to FIG. 4, each hook 215 and 216 is mounted on a hook actuator 460 and 461, respectively. A belt 470 is driven by motor 220. Hook actuator 461 is fastened to a lower portion 473 of belt 470 and hook actuator 460 is fastened to an upper portion 472 of belt 470. To move hooks 215 and 216 together, motor 220 rotates to move upper portion 472 in a direction of the −x axis, or towards the direction of glove magazine 140, simultaneously moving lower portion 473 in a direction of the +x axis, or towards hollow tube 120. Rotating motor 220 in the opposite direction moves hooks 215 and 216 apart.

After hooks 215 and 216 are inserted into glove 205, motor 220 rotates to force apart hooks 215 and 216, thereby stretching opening 212. After opening 212 is stretched by hooks 215 and 216, and glove 205 is temporarily adhered to hooks 215 and 216, vacuum head 230 releases its hold on glove 205 by turning off the vacuum suction to vacuum orifice 232. Transporter 210 then moves vacuum head 230 horizontally away from hooks 215 and 216, back towards glove magazine 140.

Hook actuators 460 and 461 are able to exert a force to stretch thickened glove lip 206 of opening 212. In order to allow a relatively small motor such as motor 220 to exert a force sufficient to force open glove opening 212, a worm gear in motor 220 generates the required force.

Figure 5:
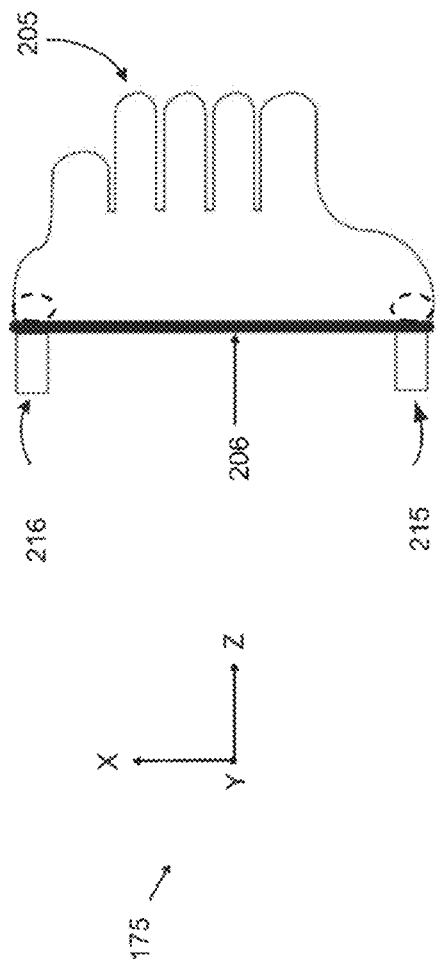
FIG. 5 is a top view of a glove after a pair of hooks have widened the glove's opening.
Figure 5A:
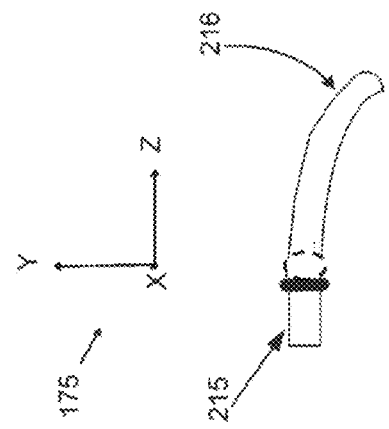
FIG. 5A is a side view of the glove of FIG. 5.
Figure 5B:
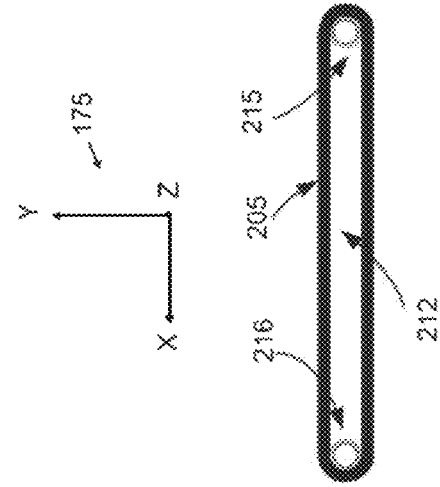
FIG. 5B is a rear view of the glove of FIG. 5.

FIGS. 5, 5A and 5B illustrate the insertion of hooks 215 and 216 into opening 212, and the subsequent stretching of glove opening 212 by hooks 215 and 216.

Referring to FIG. 5, a top view of glove 205 is shown, after hooks 215 and 216 have been inserted into opening 212, and have stretched apart opening 212, including thickened glove lip 206. Vacuum head 230 has been moved away from hooks 215 and 216, back towards glove stack 207 for acquiring another glove 205 or to wait in a standby mode.

FIG. 5A shows a side view of glove 205, as situated in FIG. 5.

FIG. 5B shows a rear view of glove 205 and hooks 215 and 216, as situated in FIG. 5.

Figure 6:
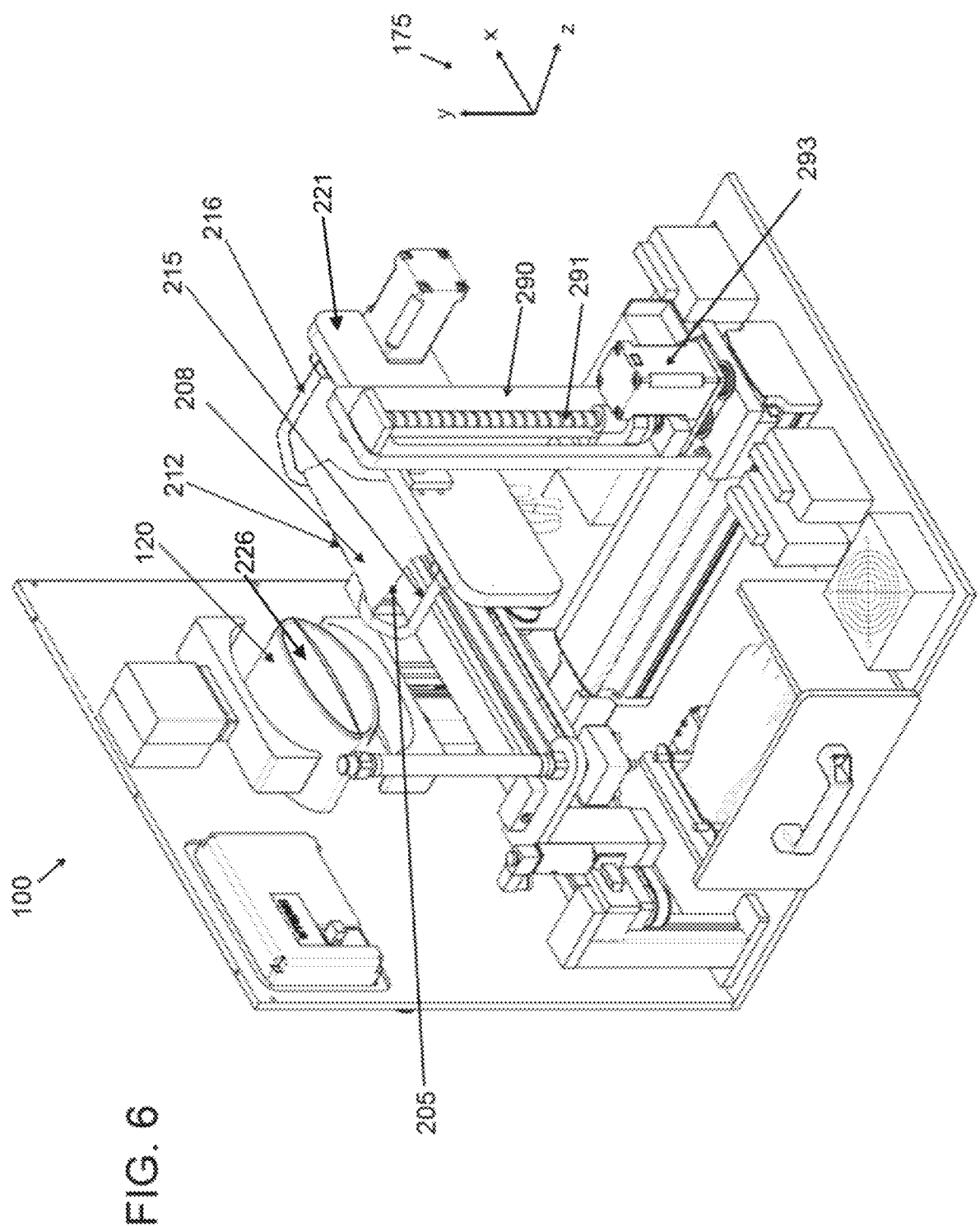
FIG. 6 is a rear perspective view of the opened GDM of FIG. 1, showing a stretched glove with the glove's opening opposite an annular opening of a hollow tube.

Referring to FIG. 6, transporter 290 moves plate 221 vertically upward along threaded rod 291 by utilization of motor 293. Thus glove 205 is elevated so that upper sleeve portion 208 of glove 205 is above hollow tube 120.

Figure 7:
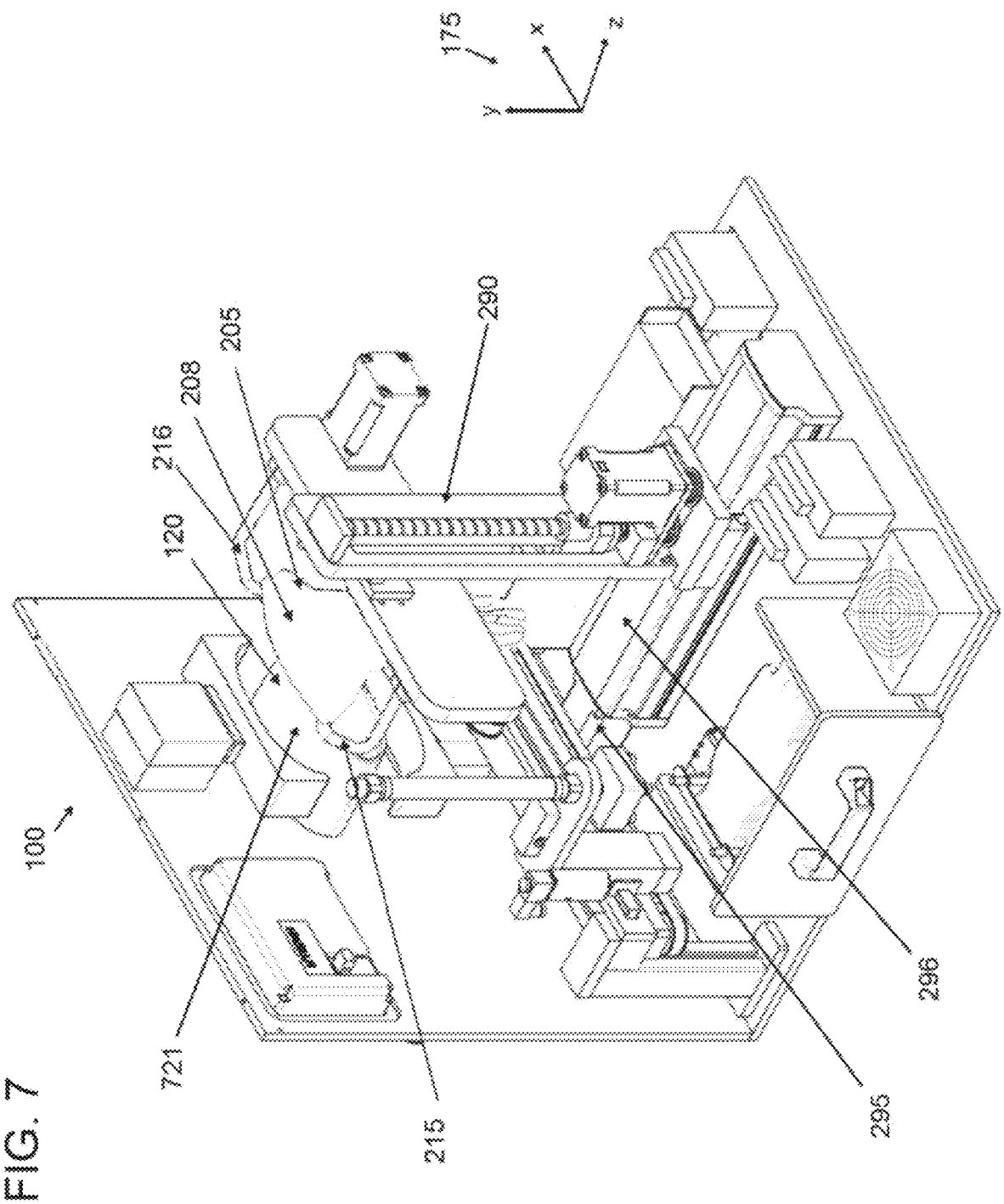
FIG. 7 is a rear perspective view the opened GDM of FIG. 1, showing a stretched glove in proximity to a hollow tube.

Referring to FIG. 7, after upper sleeve portion 208 of glove 205 is above hollow tube 120, transporter 290 is moved towards hollow tube 120, along track 296 by utilization of actuator 295.

FIGS. 7A-7E illustrate the positioning of hooks 215 and 216 after the stretching of opening 212 and prior to the placement and positioning of upper sleeve portion 208 of glove 205 onto a top surface 721 of hollow tube 120.

Figure 7A:
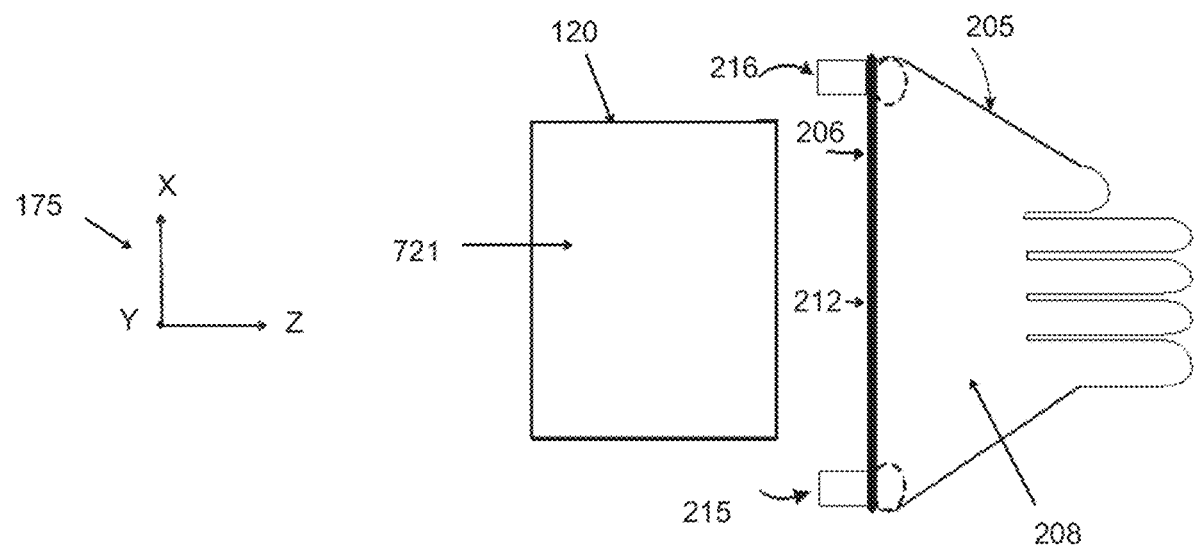
FIG. 7A is a top view of a glove after being stretched by a pair of hooks in proximity to a hollow tube.

FIG. 7A is a top view of glove 205, after hooks 215 and 216 have been inserted into opening 212, and have stretched apart opening 212, including thickened glove lip 206. The distance between hooks 215 and 216 is greater than the width of hollow tube 120.

Figure 7B:
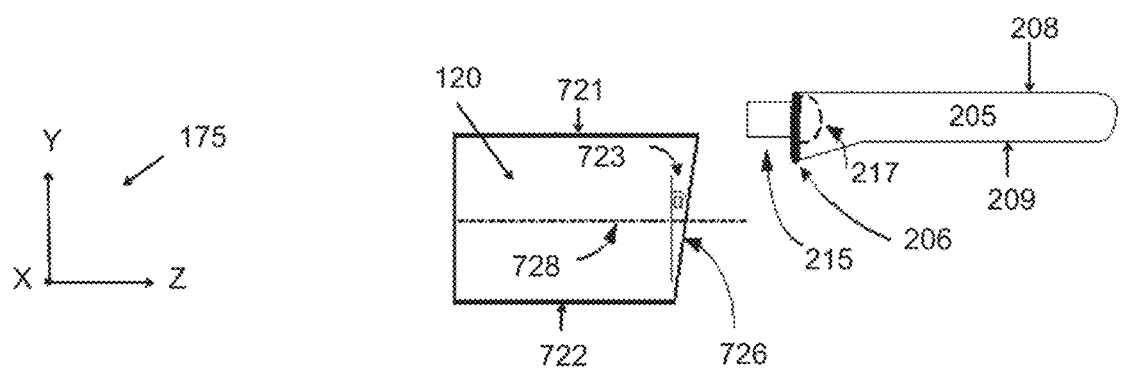
FIG. 7B is a side view of the glove as shown in FIG. 7A in proximity to the hollow tube.

FIG. 7B is a side view of glove 205 and hollow tube 120. Glove 205 has been moved by transporter 290 so that upper sleeve portion 208 of glove 205 is above top surface 721 of hollow tube 120. Hollow tube 120 has an annular opening 726 and a center axis designated as axis 728. As shown in FIG. 7B, annular opening 726 is set at an angle 723 or angle "α" with respect to a line that is perpendicular to axis 728. Angle 723 can be in a range of 0-25 degrees. When angle 723, is a non-zero angle as shown FIG. 7B, upper surface 721 protrudes towards glove 205, relative to bottom surface 722. The protrusion of upper surface 721 increases an area of adhesion of hollow tube 120 with respect to upper sleeve portion 208 and upper surface 721 while hooks 215 and 216 pull glove 205 downwards, and past bottom surface 722 of hollow tube 120. In some embodiments, upper and lower sleeve portions 208 and 209 of glove 205, respectively, overlap with the corresponding edges of upper surface 721 and bottom surface 722 of hollow tube 120 by about one centimeter. When angle 723 or angle α is non-zero, the surface overlap of upper sleeve portion 208 on upper surface 721, exceeds that of the overlap of lower sleeve portion 209 on bottom surface 722.

FIG. 7C shows glove 205 after transporter 290 has moved opening 212 further towards hollow tube 120, past the plane of annular opening 726.

FIG. 7D shows a side view of glove 205 and hollow tube 120. Transporter 290 moves glove 205 vertically downward, so that upper sleeve portion 208 of glove 205, contacts upper surface 721 of hollow tube 120. Thus, upper sleeve portion 208 of glove 205 is in contact with upper surface 721 of hollow tube 120, after transporter 290 has moved hooks 215 and 216 towards hollow tube 120 and then vertically downwards.

FIG. 7E shows a rear cross-sectional view of glove 205 and hollow tube 120. As shown in FIG. 7C, upper sleeve portion 208 of glove 205 is touching upper surface 721 of hollow tube 120.

Figure 8:
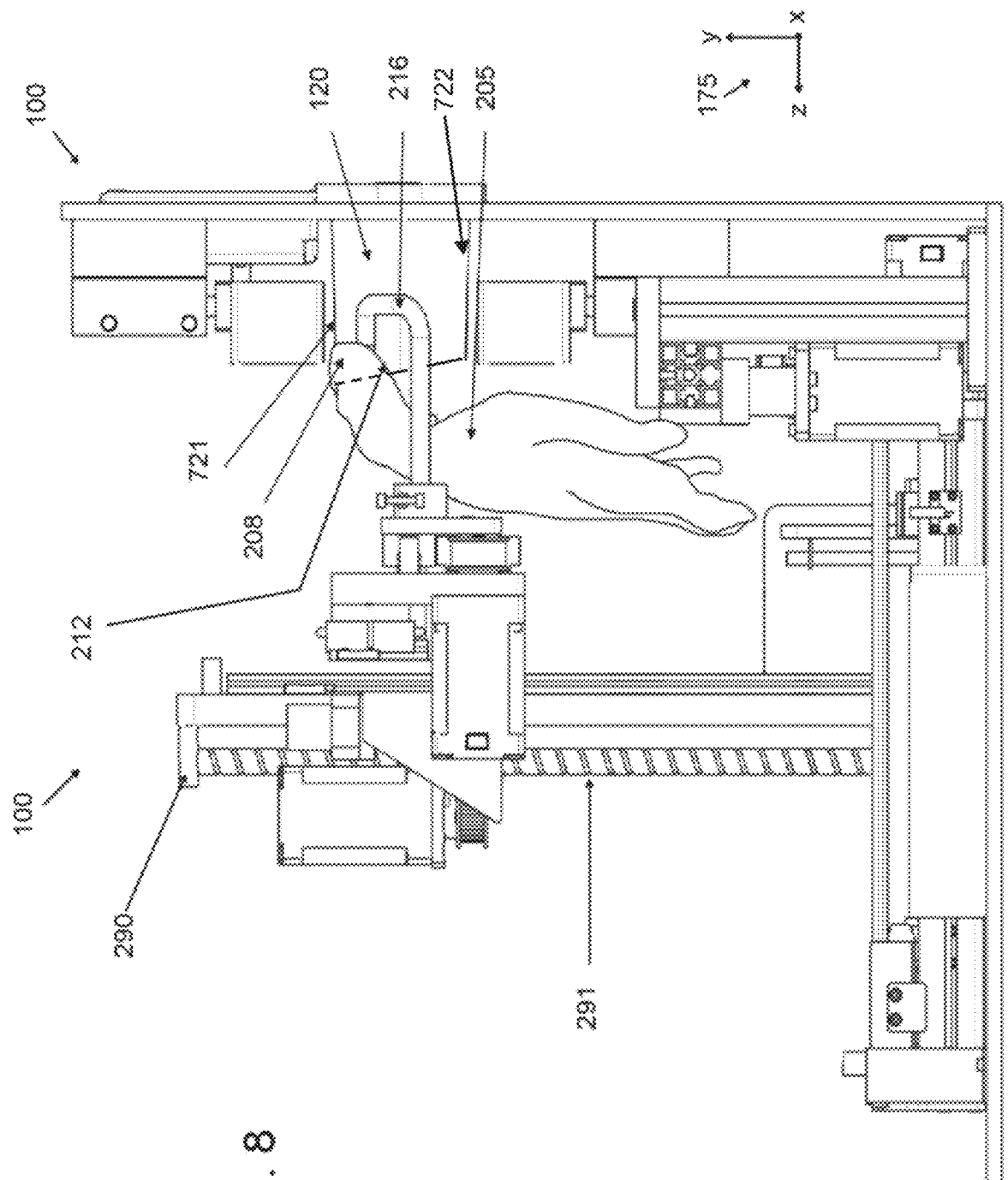
FIG. 8 is a side view of the opened GDM of FIG. 1, showing the stretched glove contacting a top surface of the hollow tube.

Referring to FIG. 8, glove 205 is shown after upper sleeve portion 208 of glove 205 is made to contact upper surface 721 of hollow tube 120.

Figure 8A:
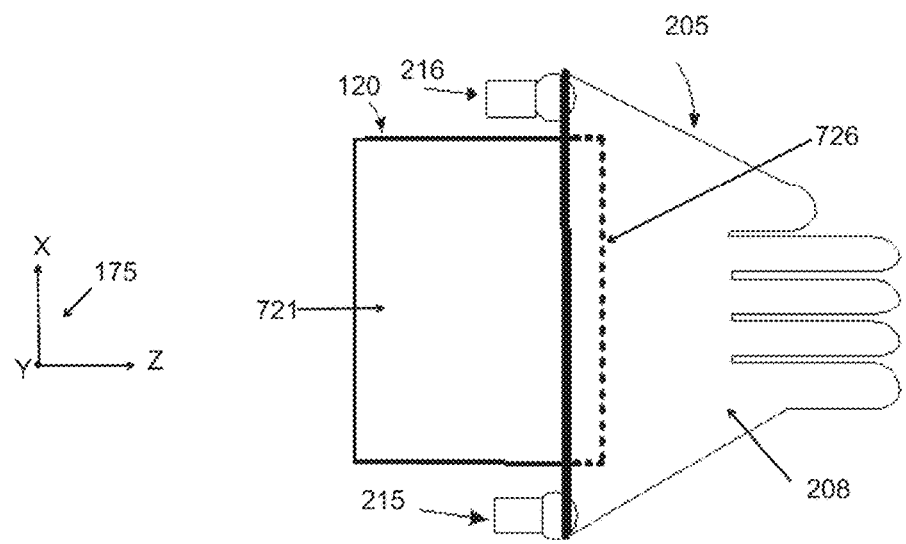
FIG. 8A is a top view of a glove as after the glove has contacted the top surface of the hollow tube and is being further stretched by the hooks.
Figure 8C:
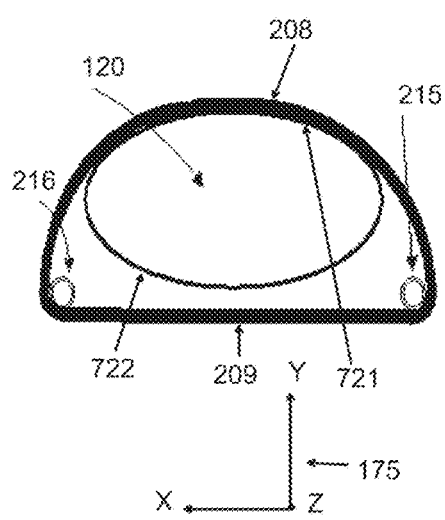
FIG. 8C is a rear cross-sectional view of the glove as shown in FIG. 8B.
Figure 8B:
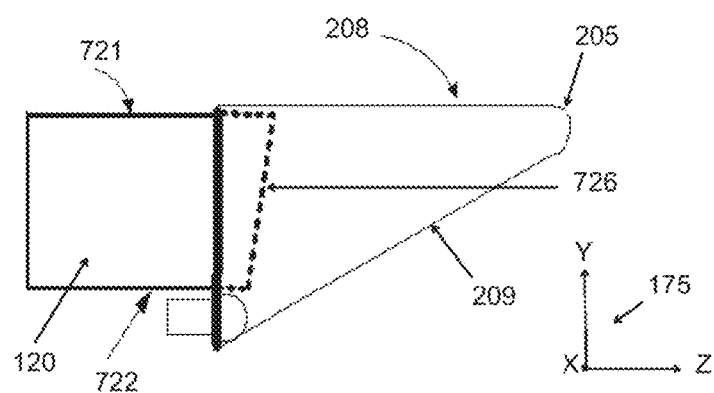
FIG. 8B is a side view of the glove as shown in FIG. 8A.

FIGS. 8A-8C illustrate the attachment of glove 205 to hollow tube 120. Specifically, these figures show the positioning of hooks 215 and 216 after the placement and attachment of upper sleeve portion 208 of glove 205 onto top surface 721 of hollow tube 120, and during the lowering of hooks 215 and 216 to attach lower sleeve portion 209 of glove 205 to bottom surface 722 of hollow tube 120.

Referring to FIG. 8A, hooks 215 and 216 are kept apart from each other so that the distance between them is greater than the width of hollow tube 120.

FIG. 8B is a side view of glove 205 after transporter 290 has moved hooks 215 and 216, and glove 205, vertically downward, so that upper sleeve portion 208 of glove 205 makes contact with upper surface 721 of hollow tube 120. With friction holding upper sleeve portion 208 onto upper surface 721, as hooks 215 and 216 are moved further downward, lower sleeve portion 209 of glove 205 is stretched below bottom surface 722 of hollow tube 120. Thus, hooks 216 and 215 stretch opening 212 downwards, completing a wrapping and positioning of opening 212 of glove 205 onto annular opening 726 of hollow tube 120.

FIG. 8C is a rear cross-sectional view of glove 205 after hooks 215 and 216 have moved downward by transporter 290, so that lower sleeve portion 209 of glove 205 is stretched below bottom surface 722 of hollow tube 120. After hooks 215 and 216 reach this position, hooks 215 and 216 are moved towards hollow tube 120 by transporter 290, so that hooks 215 and 216 exit opening 212, and lower sleeve portion 209 of glove 205, snaps upwards and comes into contact with bottom surface 722 of hollow tube 120.

Figure 9:
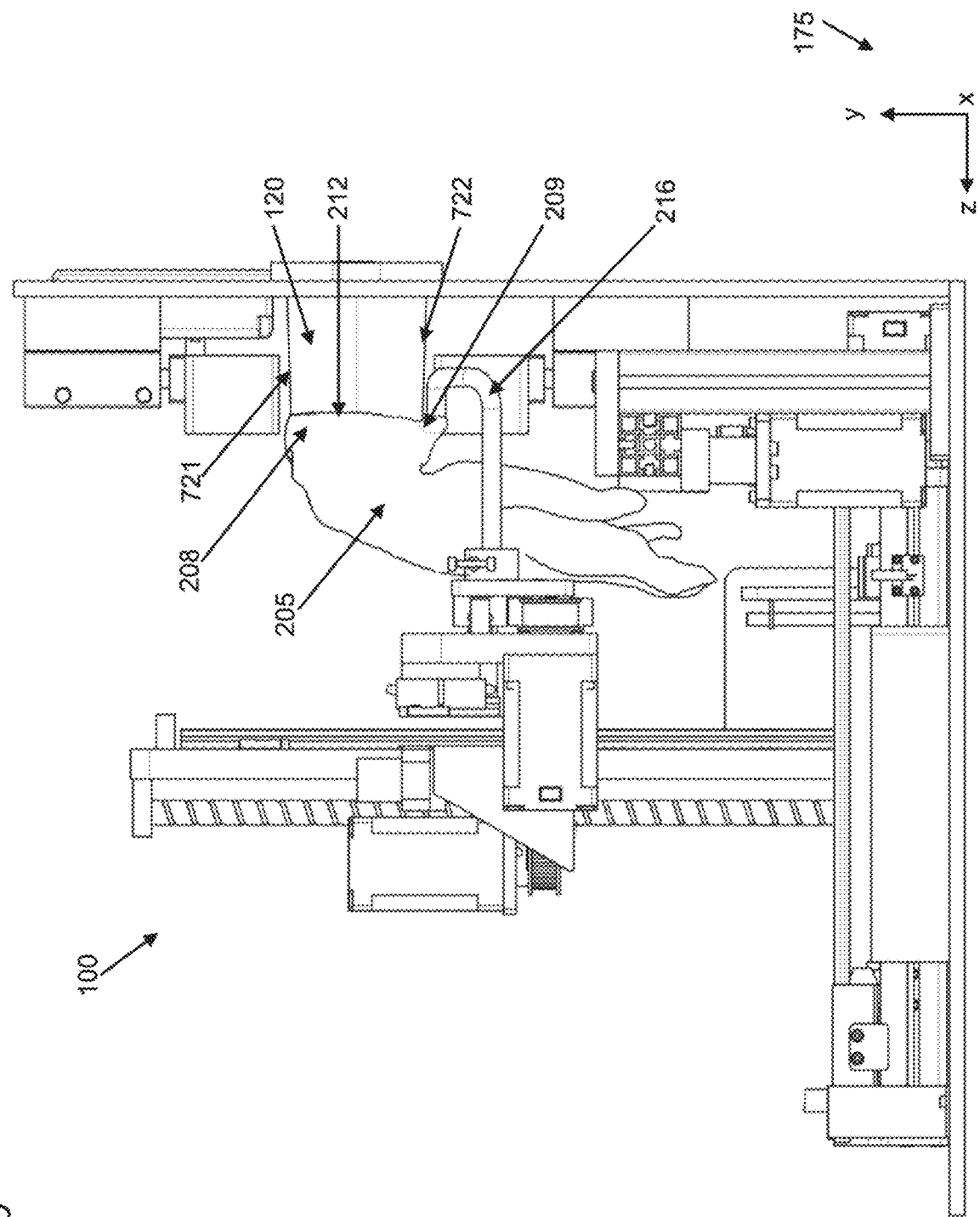
FIG. 9 is a side view of the opened GDM of FIG. 1, showing the hooks stretching the glove opening downwards, over a bottom surface of a hollow tube.

Referring to FIG. 9, glove 205 is shown just before hooks 215 and 216 are removed from opening 212 so that lower sleeve portion 209 of glove 205 snaps upward and comes into contact with bottom surface 722 of hollow tube 120. After hooks 215 and 216 have stretched glove 205 as shown in FIG. 8C, hooks 215 and 216 are moved further towards hollow tube 120, by transporter 290 (along the z axis) so as to bring lower sleeve portion 209 into overlap with bottom surface 722 and to withdraw hooks 215 and 215 from opening 212. This ensures a greater contact area between lower sleeve portion 209 of glove 205 and bottom surface 722 of hollow tube 120, once lower sleeve portion 209 snaps upward into contact with bottom surface 722.

Figure 10:
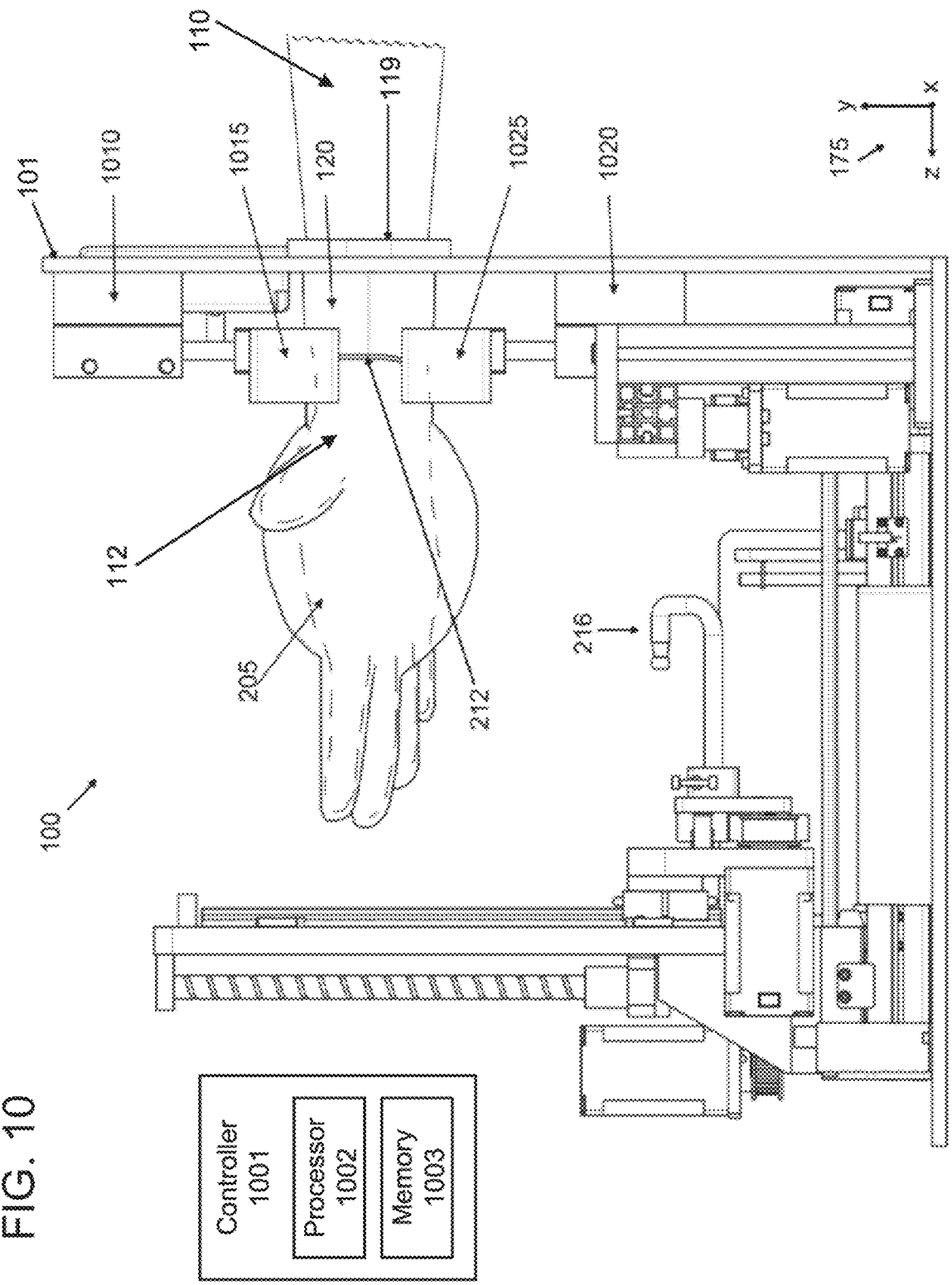
FIG. 10 is a side view of the opened GDM of FIG. 1, that shows an inflated glove clamped to a hollow tube, with a hand inserted into the glove.

Referring to FIG. 10, after opening 212 of glove 205 is wrapped around and placed over annular opening 726 of hollow tube 120, hooks 215 and 216 are then moved further towards hollow tube 120, so that ends 217 of hooks 215 and 216 are extracted or exit opening 212. Hooks 215 and 216 are then moved vertically downwards and away from hollow tube 120 by transporter 290. An actuator 1010 then moves and presses a clamp 1015 downwards, trapping upper sleeve portion 208 of glove 205 onto upper surface 721 of hollow tube 120. Similarly, an actuator 1020 moves a clamp 1025 upwards to trap lower sleeve portion 209 of glove 205 onto lower surface 722 of hollow tube 120 from below. Clamps 1015 and 1025 are complementarily shaped with regards to the shape of hollow tube 120. The shape of the inner surfaces of clamps 1015 and 1025 have curvatures that match the top and bottom curvatures of hollow tube 120, so as to better enable clamps 1015 and 1025 to press and hold glove 205 onto top and bottom surfaces 721 and 722 of hollow tube 120, with maximum surface area contact.

Blower 282 can lower the air pressure inside case 101 to create a partial vacuum when case 101 is an airtight enclosure, thus the ambient pressure outside case 101 inflates glove 205 by air entering through opening 119, and past sealing flaps 226. As shown in FIG. 10, hand 112 has then been inserted through hollow tube 120, past sealing flaps 226 and into glove 205. Advantageously, the inflation of glove 205 enables user 110 to insert hand 112 into glove 205 to don the glove with minimal effort. Glove 205, is able to maintain its inflated state, while hand 112 is placed within hollow tube 120, as hand 112 does not prevent air from outside case 101 from moving into hollow tube 120, past hand 112, and into glove 205, when blower 282 lowers the air pressure within case 101. Hollow tube 120 has an inner diameter that is greater than a diameter of hand 112.

In one embodiment, GDM 100 transports and places glove 205 onto hollow tube 120, readying glove 205 for donning in advance by user 110. Display 150 provides an indication to user 110 that glove 205 is ready to don. Upon detection of hand 112 in hollow tube 120 by sensor 121, blower 282 is activated to create a partial vacuum in case 101, thereby inflating glove 205, allowing hand 112 to easily enter glove 205. Sensor 121 senses an insertion of hand 112 into hollow tube 120, and after a time delay, clamps 1015 and 1025 are released, so that clamps 1015 and 1025 no longer touch glove 205 and hollow tube 120. After clamps 1015 and 1025 are released, hand 112 may push further into hollow tube 120, thereby pushing glove 205 off hollow tube 120. Then hand 112 with glove 205 donned, is free to retract out of GDM 100. GDM 100 can detect the removal of hand 112 with glove 205 by use of sensor 121 in hollow tube 120 and proceed to place another glove 205 onto hollow tube 120 as described herein.

In a second embodiment, once sensor 121 detects hand 112, partially inserted in hollow tube 120, so that hand 110 does not move past sealing flaps 226, GDM 100 transports and places glove 205 on hollow tube 120. GDM 100 then inflates glove 205, by activating blower 282 to decrease air pressure within case 101. When glove 205 is inflated, user 110 is notified that glove 205 is ready to don, by a visual indication on display 150, and/or an audible indication through a speaker (not shown). User 110, then enters hand 112 into glove 205. After a time delay, clamps 1015 and 1025 are released, so that clamps 1015 and 1025 no longer touch glove 205 and hollow tube 120. After clamps 1015 and 1025 are released, hand 112 may push further into hollow tube 120, thereby pushing glove 205 off hollow tube 120. Then the hand 112 with glove 205 donned, is free to retract out of GDM 100.

GDM 100 can be powered down, with glove 205 placed onto and remaining on hollow tube 120, with glove 205 deflated, until GDM 100 is powered back on. Once GDM 100 is powered on, and hand 112 is detected in hollow tube 120 by sensor 121, glove 205 is inflated prior to the insertion of hand 112 as described above.

GDM 100 includes a controller 1001 that controls operations of other components of GDM 100 described herein, e.g., solenoid valve 202, transporters 210, and 290, motors 236, 220 and 293 and actuators 234, 295, 1010, 1020, clamps 1015 and 1025, hook actuators 460 and 461, display 150, vacuum head 230, vacuum orifice 232, sensor 121 and blower 282. Controller 1001 includes a processor 1002 and a memory 1003.

Processor 1002 is an electronic device configured of logic circuitry that responds to and executes instructions.

Memory 1003 is a tangible, non-transitory, computer-readable storage device encoded with a computer program. In this regard, memory 1003 stores data and instructions, i.e., program code, that are readable and executable by processor 1002 for controlling the operation of processor 1002. Memory 1003 may be implemented, for example, in a random access memory (RAM), a read only memory (ROM), or a combination thereof.

Sensor 121 is connected to controller 1001, and when sensor 121 detects hand 112 inside or near hollow tube 120, sensor 121 produces and sends a signal to controller 1001. Controller 1001 receives the signal from sensor 121, and operates GDM 100 as described herein, including causing glove 205 to be placed onto hollow tube 120, and causing clamps 1015 and 1025 to extend towards and retract from hollow tube 120, by use of actuators 1010 and 1020. Controller 1001, also controls the time delay from when the signal is received from sensor 121, to when clamps 1015 and 1025 disengage from hollow tube 120.

GDM 100 can comprise two donning mechanisms (not shown), allowing both hands of a person to be donned with gloves simultaneously. The second donning mechanism would include a duplicate of all components described herein except for display 150 and controller 1001. If more than one donning mechanism is present in GDM 100, transporter 290 can be configured to move hooks 215 and 216 to position glove 205 onto more than one hollow tube 120.

As another alternative, glove stack 207 can be arranged with alternating glove orientations for left and right hands, allowing a single mechanism to don both hands. It should be noted that while GDM 100 can have one or more donning mechanisms, a user may enter their first hand with the palm facing down or up to don a first glove, then simply rotate their second hand 180 degrees with respect to the orientation used in the first hand, and then enter the second hand into the same donning mechanism. This procedure can be useful when glove magazine 140 does not have glove stack 207 with gloves in alternating orientations. In this manner a single donning mechanism may be used for both hands.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood that various changes may be made and equivalents may be substituted for elements thereof without departing from the scope. In addition, many modifications may be made to adapt a particular situation or material to the teachings of the present disclosure without departing from the scope thereof. Therefore, it is intended that the present disclosure not be limited to the particular embodiment(s) disclosed as the best mode contemplated, but that the present disclosure will include all embodiments falling within the scope of the appended claims.

What is claimed is:

1. A glove donning machine comprising:
    a hollow tube having an annular opening;
    a vacuum head configured to acquire a glove having an opening;
    a pair of hooks;
    a first transporter configured to move the vacuum head and the glove towards the pair of hooks so that the pair of hooks is inserted into the opening of the glove;
    a hook actuator configured to move the pair of hooks apart after the pair of hooks is inserted in the opening of the glove; and
    a second transporter configured to (i) move the pair of hooks and the glove towards the hollow tube, and (ii) move the pair of hooks to position the glove opening over the annular opening of the hollow tube.

2. The glove donning machine of claim 1, wherein the vacuum head further comprises a vacuum orifice located on a bottom side of the vacuum head.

3. The glove donning machine of claim 2, further comprising:
    a glove acquisition zone;
    wherein the vacuum head acquires the glove by being moved by the first transporter over the glove acquisition zone,
    wherein the first transporter is configured to move the vacuum head vertically downward, so that the vacuum orifice comes into contact with the glove,
    wherein the vacuum orifice is configured to provide vacuum suction to adhere to the glove, and
    wherein the first transporter is configured to lift the vacuum head and the glove vertically upward from the glove acquisition zone.

4. The glove donning machine of claim 1, further comprising:
    a glove magazine containing a stack of gloves.

5. The glove donning machine of claim 4, wherein the stack of gloves further comprises left and right handed gloves that are stacked in an alternating order.

6. The glove donning machine of claim 4, wherein the vacuum head acquires the glove from the stack of gloves.

7. The glove donning machine of claim 4, wherein the glove magazine further comprises:
    two vertical pins; and
    a weighted bar having two holes to accommodate the two vertical pins so that the weighted bar is vertically movable,
    wherein the stack of gloves is located between the two vertical pins, and beneath the weighted bar; and
    wherein the weighted bar compresses the stack of gloves to provide uniformity of positioning for the stack of gloves.

8. The glove donning machine of claim 1, further comprising a worm gear configured to enable the pair of hooks to generate a force to stretch the opening of the glove.

9. The glove donning machine of claim 1, wherein the glove donning machine further comprises an airtight enclosure.

10. The glove donning machine of claim 9, further comprising:
    a blower;
    wherein the blower decreases air pressure inside the airtight enclosure, to inflate the glove with ambient air pressure from outside the airtight enclosure when the glove opening is positioned over the annular opening of the hollow tube.

11. The glove donning machine of claim 1, wherein the hollow tube further comprises:
    an upper surface and a lower surface; and
    wherein the hollow tube has an axis located at a center of the hollow tube,
    wherein the axis is parallel to the upper surface and lower surface;
    an angle alpha is defined between a plane of the annular opening of the hollow tube and a plane perpendicular to the axis; and
    wherein the angle alpha is in a range of 0-25 degrees.

12. The glove donning machine of claim 1:
    wherein the glove opening further comprises an upper surface and a lower surface,
    wherein the hollow tube further comprises an upper surface and a lower surface;
    wherein the pair of hooks is configured to position the glove opening around the annular opening of the hollow tube so that the upper surface of the glove opening is in contact with the upper surface of the hollow tube, and the lower surface of the glove opening is in contact with the lower surface of the hollow tube.

13. The glove donning machine of claim 12, further comprising:
    a first clamp and a first clamp actuator that are located above the hollow tube; and
    a second clamp and a second clamp actuator that are located beneath the hollow tube,
    wherein the first clamp actuator is configured to move the first clamp into contact with the upper surface of the glove opening to hold the upper surface of the glove opening in position over the upper surface of the hollow tube, and
    wherein the second clamp actuator is configured to move the second clamp into contact with the lower surface of the glove opening to hold the lower surface of the glove opening in position under the lower surface of the hollow tube.

14. The glove donning machine of claim 13, further comprising
    a sensor for detecting a hand within the hollow tube,
    wherein the sensor is configured to cause the first clamp and the second clamp to retract from the hollow tube after a time delay after the sensor detects the hand.

15. The glove donning machine of claim 1, further comprising a display;
    wherein the display is configured to provide a visual indication that the glove is ready to don once the glove is positioned over the annular opening of the hollow tube.

16. The glove donning machine of claim 1, further comprising a speaker;

wherein the speaker is configured to provide an audible indication that the glove is ready to don once the glove is positioned over the annular opening of the hollow tube.

\* \* \* \* \*